United States Patent
Jagota et al.

(10) Patent No.: US 10,614,393 B2
(45) Date of Patent: Apr. 7, 2020

(54) ASSOCIATING JOB RESPONSIBILITIES WITH JOB TITLES

(71) Applicant: salesforce.com, inc., San Francisco, CA (US)

(72) Inventors: Arun Kumar Jagota, Sunnyvale, CA (US); Govardana Sachithanandam Ramachandran, Palo Alto, CA (US); Hawro Mustafa, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 695 days.

(21) Appl. No.: 15/143,219

(22) Filed: Apr. 29, 2016

(65) Prior Publication Data

US 2017/0316361 A1    Nov. 2, 2017

(51) Int. Cl.
*G06Q 10/06* (2012.01)
*G06F 16/901* (2019.01)
*G06F 16/9535* (2019.01)

(52) U.S. Cl.
CPC ... *G06Q 10/06313* (2013.01); *G06F 16/9024* (2019.01); *G06F 16/9535* (2019.01)

(58) Field of Classification Search
CPC ............. G06F 16/9535; G06F 16/9024; G06F 17/277; G06Q 10/063; G06Q 10/06313; G06Q 10/067
See application file for complete search history.

(56) References Cited

U.S. PATENT DOCUMENTS

| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |

(Continued)

OTHER PUBLICATIONS

Nagl_Till, Duval_Erick, Moere_Vande, Kloeckl_Krisitan, and Ratti_Carlo, 2012, Sankey Arcs—Visualizing edge weights in path graphs, Europrahics Confernce on Visualization (Euro Vis), pp. 1-5.*

(Continued)

*Primary Examiner* — Matthew S Gart
*Assistant Examiner* — Stephen S Swartz
(74) *Attorney, Agent, or Firm* — Dergosits & Noah LLP; Todd A. Noah (57) ABSTRACT

Associating job responsibilities with job titles is described. A database system identifies a job level and a job department associated with a job title stored by an object. The database system identifies level-based job responsibilities associated with the job level. The database system identifies department-based job responsibilities associated with the job department. The database system identifies at least one job responsibility associated with the job title based on the level-based job responsibilities and the department-based job responsibilities. The database system stores each identified job responsibility in metadata and/or a field associated with the object. The database system outputs a message based on the object to a user device, in response to a search that specifies any identified job responsibility.

18 Claims, 4 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,195,488 B1* | 6/2012 | Taix ............... G06Q 10/063 |
| | | 705/7.11 |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,679,264 B2* | 6/2017 | B'Far ............... G06Q 10/06311 |
| 9,830,353 B1* | 11/2017 | Dalmia ............... G06F 16/2453 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0143161 A1* | 6/2006 | Munro ............... G06F 17/30864 |
| 2006/0143194 A1* | 6/2006 | Stewart ............... G06Q 10/06 |
| 2006/0218394 A1* | 9/2006 | Yang ............... G06F 21/604 |
| | | 713/167 |
| 2006/0229899 A1* | 10/2006 | Hyder ............... G06Q 10/10 |
| | | 705/1.1 |
| 2008/0162207 A1* | 7/2008 | Gross ............... G06F 8/35 |
| | | 703/2 |
| 2008/0168063 A1* | 7/2008 | Whitson ............... G06F 21/604 |
| 2009/0063415 A1 | 3/2009 | Chatfield et al. |
| 2009/0076865 A1* | 3/2009 | Rousselle ............... G06Q 10/00 |
| | | 705/7.36 |
| 2009/0100342 A1 | 4/2009 | Jakobson |
| 2009/0177744 A1 | 7/2009 | Marlow et al. |
| 2009/0222298 A1* | 9/2009 | Atmaja ............... G06Q 10/067 |
| | | 705/348 |
| 2010/0049574 A1* | 2/2010 | Paul ............... G06Q 10/06 |
| | | 705/7.25 |
| 2012/0095799 A1* | 4/2012 | Jacobson ............... G06Q 10/06311 |
| | | 705/7.15 |
| 2012/0233137 A1 | 9/2012 | Jakobson et al. |
| 2012/0239454 A1* | 9/2012 | Taix ............... G06Q 10/00 |
| | | 705/7.26 |
| 2012/0253872 A1* | 10/2012 | Peters ............... G06Q 10/06311 |
| | | 705/7.13 |
| 2013/0218948 A1 | 8/2013 | Jakobson |
| 2013/0218949 A1 | 8/2013 | Jakobson |
| 2013/0218966 A1 | 8/2013 | Jakobson |

(56) References Cited

U.S. PATENT DOCUMENTS

| | | | | |
|---|---|---|---|---|
| 2014/0214945 | A1* | 7/2014 | Zhang | H04L 67/306 |
| | | | | 709/204 |
| 2014/0359537 | A1 | 12/2014 | Jakobson et al. | |
| 2015/0007050 | A1 | 1/2015 | Jakobson et al. | |
| 2015/0095162 | A1 | 4/2015 | Jakobson et al. | |
| 2015/0135043 | A1* | 5/2015 | Apps | G06Q 10/10 |
| | | | | 715/202 |
| 2015/0172563 | A1 | 6/2015 | Jakobson et al. | |
| 2015/0317610 | A1* | 11/2015 | Rao | G06Q 10/1053 |
| | | | | 705/321 |
| 2016/0034305 | A1* | 2/2016 | Shear | G06F 16/245 |
| | | | | 707/722 |
| 2016/0292248 | A1* | 10/2016 | Garcia | G06Q 10/063 |
| 2016/0314123 | A1* | 10/2016 | Ramachandran | G06F 17/3053 |
| 2017/0235848 | A1* | 8/2017 | Van Dusen | H04L 41/04 |
| | | | | 705/12 |
| 2017/0236081 | A1* | 8/2017 | Smith | G06Q 10/0637 |
| | | | | 705/7.36 |

OTHER PUBLICATIONS

Nagl Till, DuvaLErick, Moere_Vande, KloeckLKrisitan, and Ratti_Carlo, 2012, Sankey Arcs—Visualizing edge weights in path graphs, Europrahics Confernce on Visualization (Euro Vis), pp. 1-5 (Year: 2012).*

U.S. Appl. No. 13/986,251, filed Apr. 16, 2013.

* cited by examiner

ASSOCIATING JOB RESPONSIBILITIES WITH JOB TITLES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A contacts database can store digital objects for each person who may be able to help in achieving a goal. Each object usually consists of a few standard fields, such as first name, last name, company name, job title, address, telephone number, e-mail address, fax number, and mobile phone number. Contacts database users may create custom objects to store non-standard information. There is significant value in enriching a contacts database with information identifying the job responsibilities of a contact. This information may enable sales and marketing users to prospect and build lists by job responsibilities, in addition to other criteria.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for associating job responsibilities with job titles. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for associating job responsibilities with job titles will be described with reference to example embodiments. The following detailed description will first describe a method for associating job responsibilities with job titles. Next, example graphs for associating job responsibilities with job titles are described.

In accordance with embodiments described herein, there are provided systems and methods for associating job responsibilities with job titles. A database system identifies a job level and a job department associated with a job title stored by an object. The database system identifies level-based job responsibilities associated with the job level. The database system identifies department-based job responsibilities associated with the job department. The database system identifies at least one job responsibility associated with the job title based on the level-based job responsibilities and the department-based job responsibilities. The database system stores each identified job responsibility in metadata and/or a field associated with the object. The database system outputs a message based on the object to a user device, in response to a search that specifies any identified job responsibility.

For example, the database system identifies the job level Vice President and the job department Sales from the contact John Smith's job title Vice President of Sales. The database system determines that a data set indicates that 80% of Vice President-level jobs in a sales department have Business Development job responsibilities and that 40% of Vice President-level jobs in a sales department have Channel Marketing job responsibilities. The database system determines that the data set indicates that 45% of vice president level Sales jobs have Account Management job responsibilities, 40% of vice president level Sales jobs have Partner Management job responsibilities, and that 35% of vice president level Sales jobs have Business Development job responsibilities. The database system identifies a Business Development job responsibility associated with the job title Vice President of Sales based on the Vice President-level job responsibilities and the Sales department-based job responsibilities. The database system stores the identified Business Development job responsibility in metadata associated with John Smith's contact object. The database system outputs John Smith's contact object as a lead to a marketer in response to the marketer's search for contacts with the identified Business Development job responsibility.

While one or more implementations and techniques are described with reference to an embodiment in which associating job responsibilities with job titles is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

A hierarchical job responsibilities algorithm can organize a given set of job responsibilities into a multilevel taxonomy, and leverage the taxonomy in identifying job responsibilities based on job titles. The hierarchical algorithm can use three levels: level 1 for department, level 2 for top level job responsibilities in a department, and level 3 for job responsibilities within a level 2 job responsibility. This multilevel taxonomy is a directed acyclic graph, instead of a tree. Multiple departments can have the same level 2 job responsibility, and multiple level 2 job responsibilities can have the same level 3 job responsibility. As examples, Marketing is a department (level 1 taxonomy item) with Brand Management as one of its children (level 2 item), and Data Science is a level 2 job responsibility with Predictive Analytics as one of its children (level 3 item).

The hierarchical algorithm is:

```
Input : Job title T
R ← { }
if T contains one or more level 2 job responsibilities // identify job
responsibilities in title
    Add the (level 3) children of these job responsibilities to R
else
    R ← identify(level(T),departments(T))// identify from job level &
    departments of job title
endif
if the related job responsibilities graph contains job responsibilities
related to those in R
// identify related job responsibilities
    Add these job responsibilities to R
endif
```

The operation "add job responsibility to R" is assumed to only add a job responsibility to R if the job responsibility is not already in R. The hierarchical algorithm has three distinct components in the pseudocode above: identify job responsibilities in job title, identify from job level and job departments of job title, and identify related job responsibilities. These components are covered separately below by corresponding algorithms.

To understand why the identify job responsibilities in job title algorithm is a somewhat elaborate algorithm instead of a simpler algorithm, consider the following scenario. The following are some members in the level 2 taxonomy: interactive marketing, digital marketing, online marketing, mobile marketing, and social marketing. The identify job responsibilities in job title algorithm should be able to identify the interactive marketing job responsibility and the digital marketing job responsibility in the Vice President of Interactive and Digital Marketing job title, and should be able to identify the online marketing job responsibility, the mobile marketing job responsibility, and the social marketing job responsibility in the Vice President—Online Marketing, Mobile and Social job title. To efficiently realize such identifications, which involves accounting for word reversals and intervening words, the identify job responsibilities in job title algorithm creates a custom inverted index from the full set of level 2 job responsibilities. This index maps words to (identifiers of) job responsibilities in which they appear. The table below is an extremely simplified example of a map for an index.

| Job responsibility identifier | Job responsibility |
|---|---|
| 1 | interactive marketing |
| 2 | digital marketing |
| 3 | online marketing |
| 4 | mobile marketing |
| 5 | social marketing |

A portion of the example inverted index for these job responsibilities includes:

interactive→{1}
marketing→{1-5}

This portion of the inverted index indicates that the word interactive appears only in job responsibility 1, whereas the word marketing appears in job responsibilities 1 through 5.

Let I denote this index, with $I_w$ denoting what I maps w to. The identify job responsibilities in job title algorithm also maintains the job responsibilities in tokenized form. $W_r$ denotes the set of tokens in job responsibility r. The slop parameter d controls how far apart the words in a job responsibility are allowed to be when these words are in a job title.

The identify job responsibilities in job title algorithm's inputs are Title T and slop parameter d. The identify job responsibilities in job title algorithm includes two major steps: Step 1 tokenizes T (after downcasing) into the words sequence $<w_1, \ldots w_k>$, and creates an inverted index I(T) where, for a word w in T, $I_w(T)$ is the set of positions in the job title in which this word appears. Step 2 identifies the job responsibilities that occur in T using the sorted $<w_1, \ldots w_k>$, I(T), and $\{W_r\}$ Step 2 is described in detail in the pseudo-description below.

```
R ← { } // The set of job responsibilities in job title T
repeat
    // Iterate over words in the job title that appear in at least one
    job responsibility for each (w, i) in < w₁, . . . wₖ>, skipping
    over those w's for which Iw is empty
    // i is the position of w in < w₁, . . . wₖ>
    // Iterate over the job responsibilities containing word w
    for each responsibility r in Iw
        exit-this-for-loop if r is already in R
        all_words_of_r are_in_job_title_T and_in_proximity ← true
        // Iterate over words in job responsibility r
        for each wᵣ in Wᵣ
            // if word wᵣ does not appear in job title T
            if Iwr (T) is empty
                all_words_of_r are_in_job_title_T_and_in_proximity ← false
                exit-this-for-loop
            endif
            s ← d + |Wᵣ| − 1
            Find smallest l in Iwr(T) in [i − s, i + s]
            if no such l exists
                all_words_of_r are_in_job_title_T_and_in_proximity ← false
                exit-this-for-loop
            endif
        endfor
        if all_words_of_r are_in_job_ title_T_and_in_proximity
            Add r to R
        endif
    endfor
endfor
endrepeat
```

Step 1 runs fast because k is typically small. In step 2, the key operations that ensure speed are $I_w$ and $I_w(T)$, i.e. looking up the job responsibilities that a word is contained in, and looking up positions in the job title in which a word appears. The identify job responsibilities in job title algorithm is illustrated by the following example for the job title Vice President Online Marketing Mobile and Social. In this example, the level 2 job responsibilities are interactive marketing, digital marketing, online marketing, mobile marketing, and social marketing. For this example, the identify job responsibilities in job title algorithm uses the slop d=1. I(T) is {vice→empty, president→empty, online→{3}, marketing→{4}, mobile→{5}, and →empty, social→{7}}

The following table depicts values of key variables in a certain (interesting) iteration of the outermost for loop.

TABLE

Illustration for job title Vice President Online Marketing, Mobile and Social

| Variable | One (w, i) in this job title's word sequence $<w_1, \ldots w_k>$ | $I_w$ | One (r, $W_r$) for this w. | One ($w_r$, $I_{w,r}$, (T)) for this r. | S | l for this s |
|---|---|---|---|---|---|---|
| Value | (marketing, 4) | {1-5} | mobile marketing, {mobile, marketing} | (mobile, {5}) | 1 + 2 − 1 = 2 | 5 |

The contents of this table are read as follows. marketing is the $4^{th}$ word in this job title, and appears in job responsibilities {1-5}. One of these job responsibilities is mobile marketing. The identify job responsibilities in job title algorithm checks whether the word mobile in this job responsibility appears in the job title and, if so, where. mobile does appear as the $5^{th}$ word in the job title. The $5^{th}$ word is close enough to the $4^{th}$ word, which is where the word marketing appears in this job title. That is, these two words from the job responsibility appear sufficiently close by in the job title for the identify job responsibilities in job title algorithm to deem this job responsibility a match in job title.

A job level/job department algorithm identifies job responsibilities associated with the job level and the job department(s) identified for a job title. Let r denote a job responsibility, $l_T$ the job level of title T, and $d_T$ the job departments of title T. The job level/job department algorithm assumes that $l_T$ is a single job level, whereas $d_T$ could be one or more job departments. For example, the job level/job department algorithm processes the title Vice President of Sales and Marketing, identifies the job level is VPlevel, and identifies the job departments are Sales and Marketing. Using a Bayesian treatment, the job level/job department algorithm assigns the numerator of the right hand side of Equation 1 below as the score $S(r, l_T, d_T)$:

$$P(r|l_T, d_T) = [P(l_T|r) * (\Pi_{d \in d_T} P(d|r) * P(r)]/P(l_T, d_T) \quad \text{(Equation 1)}$$

The denominator of the right hand side of Equation 1 does not depend on r. Therefore, since the job level/job department algorithm uses the score only for ranking, the score may be defined as the numerator of the right hand side of Equation 1.

For estimating the probability distributions in the right hand side of Equation 1, the job level/job department algorithm assumes the availability of the data set $T_{DR}=\{(d, r)\}$ of (job department, level 2 job responsibility) pairs. Such a dataset is available for purchase on the market. A(d, r) pair in this dataset means that at least some job title in job department d has the job responsibility r. The same job responsibility can appear in multiple job departments. If information indicating that certain (d, r) pairs are more common than other pairs is available, this information can be captured in $T_{DR}$ by repeating such (d, r) pairs more often than other pairs. The job level/job department algorithm constructs a data set of (job level, job departments, and job responsibilities) tuples that occur in the same job title as follows. The job level/job department algorithm assembles a data set of job titles. For example, data.com has access to a large data set containing tens of millions of job titles. Let J denote this dataset. Then the job level/job department algorithm does the following.

For Each Title T in J
1. Compute the job level $l_T$ of T using a job level classifier.
2. Compute the set of job departments $d_T=\{d_T^1, \ldots d_T^n\}$ of T using a job department classifier. (a title can correspond to multiple departments)
3. Compute the job responsibilities $r_1, \ldots r_k$ in T using the approach used by the identify job responsibilities in job title algorithm. (T may not contain any responsibilities in it)
endfor The job level/job department algorithm generates data in the form of $T_{DLR}=\{(l_T, d_T^1, \ldots d_T^n, r_1, \ldots r_k), T \in J\}$ The job level/job department algorithm extracts suitable training sets from the data set for two reasons. For estimating $P(d_T|r)$ and $P(r)$, pooling the information from $T_{DR}$ and $T_{DLR}$ potentially provides richer training data. The resulting training sets may be reused by the related job responsibilities algorithm for more advanced modeling. The extracted training sets are $T_{LR}$ projection of (l, r) from $T_{DLR}$. In particular, from every tuple (l, $d_1, \ldots d_p, r_1, \ldots r_q$) in $T_{DLR}$, the job level/job department algorithm generates pairs (l, $r_1$), ..., (l, $r_q$) and adds each pair to $T_{LR}$.

$T^P_{DR}$ projection of (d, r) from $T_{DLR}$ pooled with (d, r) pairs from $T_{DR}$. In particular, from every tuple (l, $d_1, \ldots d_p, r_1, \ldots r_q$) in $T_{DLR}$, the job level/job department algorithm generates pairs ($d_1, r_1$), ..., ($d_1, r_q$), ..., ($d_p, r_1$), ..., ($d_p, r_q$) and adds each pair to $T^P_{DR}$. Next, for each pair (d, r) in $T_{DR}$, the job level/job department algorithm adds w copies of the pair into $T^P_{DR}$.

$T^P_R$ projection of (r) from $T_{DLR}$ pooled with projection of (r) from $T_{DR}$. In particular, from every tuple (l, $d_1, \ldots d_p, r_1, \ldots r_q$) in $T_{DLR}$, the job level/job department algorithm generates ($r_1$), ..., ($r_q$) tuples and adds each tuple to $T^P_R$. Next, from each pair (d, r) in $T_{DR}$, the job level/job department algorithm adds w copies of (r) into $T^P_R$.

To each of these three training sets, the job level/job department algorithm adds suitable pseudo-instances to guard against their possible incompleteness. To $T_{LR}$, the job level/job department algorithm adds a>0 copies of (l, r), for every l∈L, r∈R. To $T^P_{DR}$, the job level/job department algorithm adds b>0 copies of (d, r), for every d∈D, r∈R. To $T^P_R$, the job level/job department algorithm adds c>0 copies of (r), for every r∈R. Here a, b, and c are free parameters, which can take on values less than 1. $P(l_T-r)$, $P(r)$, and $P(d|r)$ are estimated in the usual ways from $T_{LR}$, $T^P_R$, and $T^P_{DR}$, respectively.

A related job responsibilities algorithm assumes the availability of a data set of the form $D=\{R_i\}$, $i=1, \ldots n$. i denotes a particular person or contact, and $R_i$ denotes the known set of job responsibilities of that person. A related job responsibilities graph has nodes that represent job responsibilities that occur at least once in D. Two nodes u and v are connected by an edge of weight $w_{uv}=P_{uv}/P_u*P_v$. Here $P_{uv}=|\{R_i|u \in R_i \text{ and } v \in Ri\}|/n$, $P_u=|\{R_i|u \in Ri\}|/n$, and $P_v=|\{R_i|v \in Ri\}|/n$. All edges whose weight is below a certain threshold are dropped. For example, if many people have both Business Analyst and Business Intelligence as job responsibilities the related job responsibilities graph will likely have a strongly weighted edge between the nodes in the related job responsibilities graph that correspond to these terms.

The approach by the job level/job department algorithm, as embodied in Equation 1, assumes that a job responsibility does not depend on the contents of an actual job title, provided the job level and the job department(s) of the job title are known. This simplifying assumption is reasonably effective. That is, for the purposes of scoring job responsibilities, the contents of a job title do not usually provide information beyond what is already captured in the job title's job level and job department(s). However, sometimes the contents of a job title provides more information. Consider the job titles Sales Analyst and Sales Representative. Both job titles have the same job department (Sales) and the same job level (Staff), yet their job responsibilities are different. A particular job responsibility is scored against a given job title by combining information from the contents of the job title with information about the job title's job level and job department(s). To estimate the probability of a job responsibility given a job title, the job title's job department (s) and job level are treated as latent variables, and marginalized over them. More formally, this involves probabilistic modeling on (T, D, R, L), where T, D, R, and L denote random variables (and also their universes) denoting job titles, job departments, job responsibilities, and job levels respectively. Whether a symbol is meant to denote a random variable or a universal set will be resolved from context. A sensible score function may be formulated which scores how well a particular job responsibility r ∈R fits a given job title t∈T, using the job level and job departments oft as additional features. The score function models as:

$$P(R|T)=\Sigma_{d\in D, l\in L}P(R|T,d,l)P(d,l|T) \quad \text{(Equation 2)}$$

In principle P(d, l|T) can be estimated from a slightly enriched version of $T_{DLR}$ described above for the job level/job department algorithm, for which the job title is also kept along with the rest of the tuple. This version is denoted as $T_{TDLR}$. That said, by assuming that D and L are conditionally independent given T, Equation 2 simplifies considerably in terms of model complexity. This means that more accurate models may be built from $T_{TDLR}$ under this assumption, so long as this assumption is justified, which it is. Therefore, a job department and a job level can be predicted independently from a job title. Based on this assumption:

$$P(R|T)=\Sigma_{d\in D, l\in L}P(R|T,d,l)*P(d|T)*P(l|T) \quad \text{(Equation 3)}$$

In Equation 3, for efficient computation, the sum can be truncated to those pairs (d, l) in which both P(d|T) and P(l|T) are greater than 0. Job titles are modeled in terms of certain features. As an example, the features in a job title may be chosen to be the word-level k grams in the job title, for suitably chosen positive integers k. T will be used to also denote the feature vector of a job title. Equation 3 is computed under the assumption that the features of a job title are conditionally P(d|T) independent of each other given a job department. This results in the Naive Bayes formulation:

$$P(D|T)=[P(D)*\Pi_{i=1}^{n}P(T_i|D)]/\Sigma_{d\in D}P(d)*\Pi_{i=1}^{n}P(T_i|d) \quad \text{(Equation 4)}$$

D is a random variable in the numerator. In the denominator, the set of departments. P(D) and P($T_i$|D) are estimated from the projection $T_{TD}$ of the training set $T_{TDLR}$ in the usual way. $T_{TD}$ permits the same job title to be classified to different job departments. P(D|T) leverages such cases sensibly, specifically classifying such job titles probabilistically to the job departments. Likewise, P(l|T) is computed under the assumption that the features of a job title are conditionally independent of each other given a job level.

$$P(L|T)=[P(L)*\Pi_{i=1}^{n}P(T_i|L)]/\Sigma_{l\in L}P(d)*\Pi_{i=1}^{n}P(T_i|l) \quad \text{(Equation 5)}$$

P(L) and P($T_i$|l) are estimated from the projection $T_{TL}$ of the training set $T_{TDLR}$ in the usual way. $T_{TL}$ permits the same job title to be classified to different job levels. P(L|T) leverages such cases sensibly, specifically classifying such job titles probabilistically to the job levels. To compute P(R|T, d, l) in Equation 3 from Bayes rule, $$P(R|T,d,l)=[P(T,d,l|R)*P(R)]/[\Sigma_{r\in R}P(T,d,l|r)*P(r)] \quad \text{(Equation 6)}$$

R denotes the random variable of the job responsibilities in the numerator of the right hand side and the universe of the job responsibilities in denominator of the right hand side. Based on assuming that T, D, and L are conditionally independent given R:

$$P(T,D,L|R)=P(T|R)*P(D|R)*P(L|R) \quad \text{(Equation 7)}$$

Based on assuming further that the features of T are conditionally independent given R:

$$P(T|R)=\Pi_{i=1}^{n}P(T_i|R) \quad \text{(Equation 8)}$$

The probability distributions in Equations 6, 7, and 8 are estimated as follows. P($T_i$|R) is estimated from the projection $T_{TR}$ of $T_{TDLR}$ in the usual way. P(D|R), P(L|R) and P(R) are estimated from $T^P_{DR}$, $T_{LR}$, and $T^P_R$, respectively, in the usual way. The aforementioned data sets are suitably expanded versions of ones described in the section for the job level/job department algorithm. The expansion is that R is the full set of job responsibilities, not just the level 2 job responsibilities.

Non-probabilistic alternatives exist for computing P(R|T, d, l). The Bayes approach assumes certain conditional independencies, in Equations 7 and 8, and implicitly assumes, that the training set $T_{TDLR}$ is rich enough for learning to estimate P(R|T, d, l) An alternative to making the first set of assumptions is to use some machine learning method to learn to estimate P(R|T, d, l) that can exploit combinations of features to try to predict better. The chosen features might include bags of words of T, d, and l. If on the other hand the issue is that the training set $T_{TDLR}$ is not rich enough, then the approach below is appropriate, which uses unsupervised methods for estimating P(R|T, d, l). Start by imagining a nonnegative score function S(R, T, D, L). From any such function, an empirical P(R|T, d, l) may be obtained by computing, for the given (T, d, l), the score of all R's, and normalizing in the usual way. Since the interest in this score function is only in comparing scores of different R's for the same (T, d, l), it makes sense for the score function to score R against (T, d, l), not to additionally score the internal compatibility of (T, d, l). One sensible example of this score function is:

$$S(R,T,d,l)=R*d+R*l+R*T$$

where X*Y denotes cosine similarity of idf-weighted bag-of-word vectors of strings X and Y. A more complex score function might take the form:

$$S(R,T,d,l)=f(S(R,d))+f(S(R,l))+f(S(R,T))$$

where, for two strings X and Y, S(X, Y) is a similarities vector constructed via multiple metrics, and f is a suitable aggregation function. So Si(X, Y) is the similarity of X and Y according to metric i. A sensible example would be to use two metrics. Metric 1 is cosine similarity, as described below Metric 2 is a suitable metric derived from semantic relatedness of words in semantic networks such as WordNet. A concrete example of metric 2 is to measure semantic relatedness of two words as the inverse of the graph distance (restricted to ISA relationships) between their WordNet nodes. Graph distance between two nodes is the length of the shortest path between them. This captures synonym relationships as well as the somewhat broader hyponym and hypernym relationships. Therefore, the semantic relatedness of two strings can be defined as the inverse of the average graph distances between pairs of words in them. A sensible aggregate function might be an approximate OR of the two. That is, two strings are deemed related if they are either lexically similar or semantically related.

Figure 1:
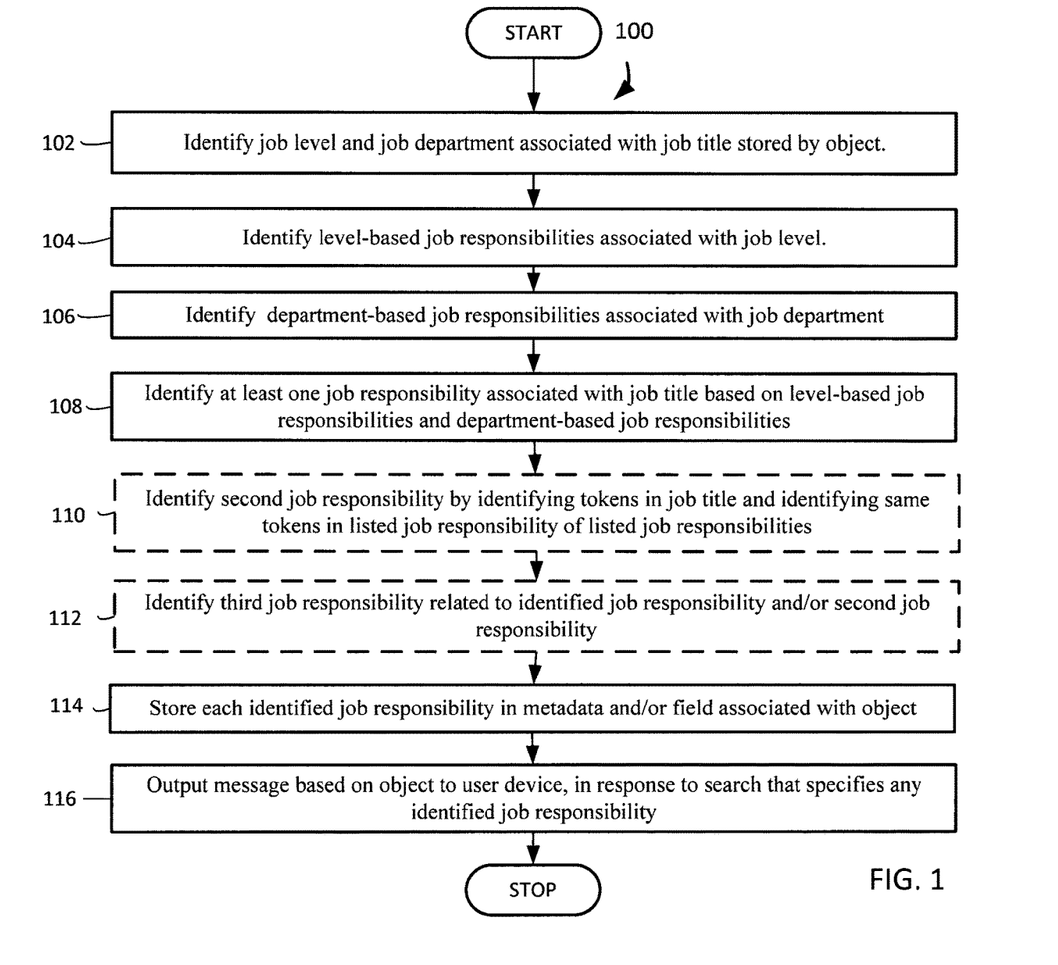
FIG. 1 is an operational flow diagram illustrating a high level overview of a method for associating job responsibilities with job titles, in an embodiment.
Figure 2A:
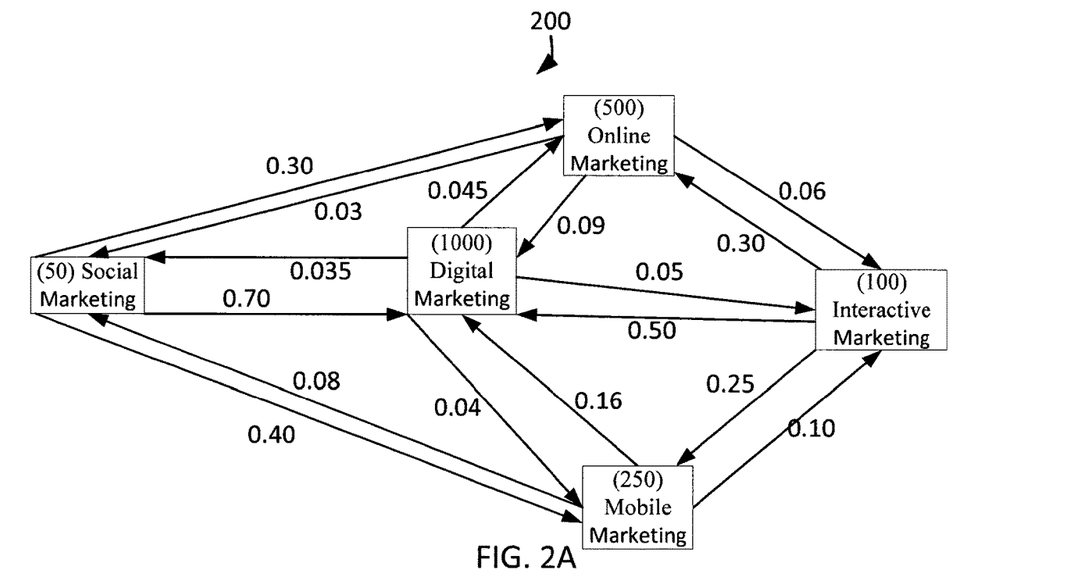
FIGS. 2A-2B illustrate example graphs used for associating job responsibilities with job titles, in an embodiment.
Figure 2B:
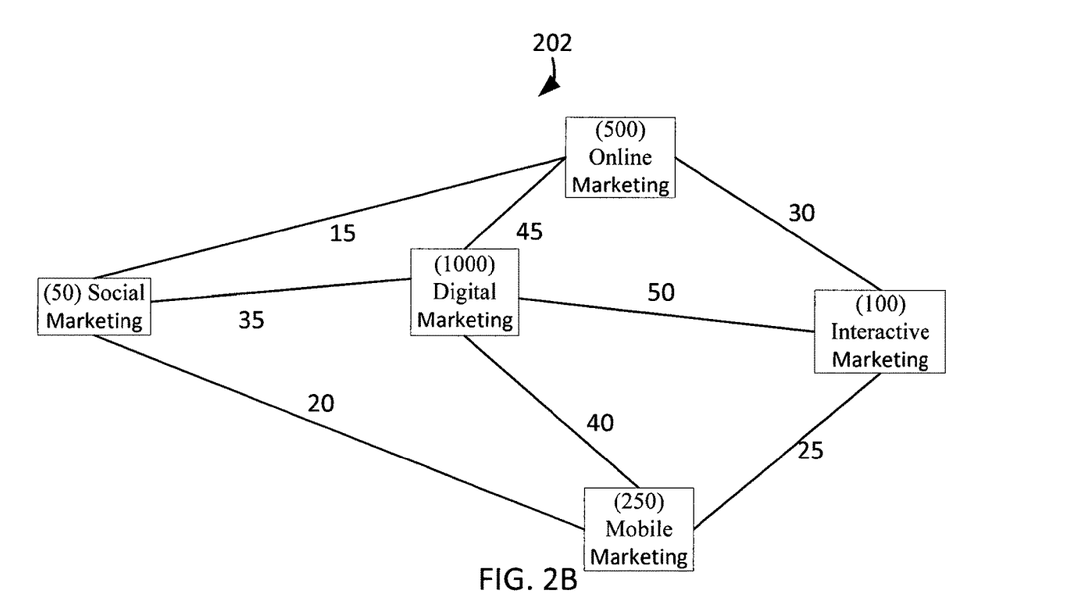

FIG. 1 is an operational flow diagram illustrating a high level overview of a method 100 for associating job responsibilities with job titles. The examples of graphs which are described below in reference to FIG. 1 are depicted in FIGS. 2A-2B and described below in reference to FIGS. 2A-2B.

A database system identifies a job level and a job department associated with a job title stored by an object, block 102. For example and without limitation, this can include the database system identifying the job level Vice President and the job department Sales from the contact John Smith's job title Vice President of Sales.

After identifying the job level, the database system identifies level-based job responsibilities associated with the job level, block 104. By way of example and without limitation, this can include the database system determining that a data set indicates that 80% of Vice President-level jobs in a sales department have Business Development job responsibilities and that 40% of Vice President-level jobs in a sales department have Channel Marketing job responsibilities.

Having identified the job department, the database system identifies department-based job responsibilities associated with the job department, block 106. In embodiments, this can include the database system determining that the data set indicates that 45% of vice president level Sales jobs have Account Management job responsibilities, 40% of vice president level Sales jobs have Partner Management job responsibilities, and that 35% of vice president level Sales jobs have Business Development job responsibilities.

After identifying the level-based job responsibilities and the department-based job responsibilities, the database system identifies at least one job responsibility associated with the job title based on the level-based job responsibilities and the department-based job responsibilities, block 108. For example and without limitation, this can include the database system identifying a Business Development job responsibility associated with the job title Vice President of Sales based on the Vice President-level job responsibilities and the Sales department-based job responsibilities. Although this example describes identifying one job responsibility based on the job level and the job department identified for a job title, the database system may identify many such job responsibilities. While this example describes identifying a job responsibility associated with a job title based on a job responsibility that was identified by both the level-based job responsibilities and the department-based job responsibilities, the database system may identify a job responsibility for a job title without the job responsibility being identified by both the level-based job responsibilities and the department-based job responsibilities. The database system may identify a job responsibility for a job title based on scoring the level-based job responsibilities and the department-based job responsibilities, and comparing the resulting scores for a corresponding job responsibility to a score threshold.

The database system identifying a job responsibility may also be based on a set of general job responsibilities, with each of the set of general job responsibilities associated with a corresponding job responsibility frequency. For example, the database system may also use a set of general job responsibilities that include level-based job responsibilities other than the Vice President level job responsibilities and department-based job responsibilities other than Sales department-based job responsibilities, such as a data set which indicates that 2% of jobs have a cooking responsibility and 1% of jobs have a cleaning responsibility.

Having identified at least one job responsibility, the database system optionally identifies a second job responsibility by identifying tokens in the job title and identifying the tokens in a listed job responsibility of listed job responsibilities, block 110. By way of example and without limitation, this can include the database system identifying that Mobile Marketing is a listed job responsibility, the word Marketing is the $4^{th}$ word in Jane Doe's job title Vice President—Online Marketing, Mobile, and Social, the word Mobile is the $5^{th}$ word in her job title Vice President—Online Marketing, Mobile, and Social, and that the $4^{th}$ position in the job title is within the specified 2 word gap of the $5^{th}$ position in this job title.

After identifying at least one job responsibility, the database system optionally identifies a third job responsibility related to the at least one job responsibility and/or the second job responsibility, block 112. In embodiments, this can include the database system identifying the Digital Marketing job responsibility as related to the Interactive Marketing job responsibility by first identifying the Interactive Marketing job responsibility, then identifying a graph node for the Interactive Marketing job responsibility, and finally identifying a 50% weighted arc from the graph node for the Interactive Marketing job responsibility to a related graph node for the Digital Marketing job responsibility. The graph indicates that 50% of jobs with the Interactive Marketing job responsibility also have the Digital Marketing job responsibility. Examples of graphs for associating job responsibilities with job titles are depicted in FIGS. 2A-2B, and discussed below in reference to FIGS. 2A-2B.

Having identified at least one job responsibility, the database system stores each identified job responsibility in metadata and/or a field associated with the object, block 114. For example and without limitation, this can include the database system storing the identified Business Development job responsibility in metadata associated with John Smith's contact object. In another example, the database system stores the identified Mobile Marketing job responsibility in metadata associated with Jane Doe's contact object. In yet another example, the database system stores the identified Interactive Marketing job responsibility and the Digital Marketing job responsibility in metadata associated with the corresponding contact object. In a further example, the database system stores the identified Business Development job responsibility in a field in John Smith's contact object. In an additional example, the database system stores the identified Business Development job responsibility in a field of an object that is a child object for John Smith's contact object.

After storing each identified job responsibility, the database system outputs a message based on the object to a user device, in response to a search that specifies any identified job responsibility, block 116. By way of example and without limitation, this can include the database system outputting John Smith's contact object in response to a system user's search for contacts with the identified Business Development job responsibility. In another example, the database system outputs Jane Doe's contact object as a suggested lead to a marketer because the database system identified the marketer's previous success at prospecting leads with the Mobile Marketing job responsibility, searched for contacts with the identified Mobile Marketing job responsibility, and identified Jane Doe's contact object with the identified Mobile Marketing job responsibility, which may be referred to as predictive lead scoring.

The database system may provide automated discovery of success predicting job functions. Consider a historical data set of success-labeled leads. "Success-labeled" means it is known whether pursuing a lead yielded success or failure. The database system predicts job function(s) of these leads in the manner described in the previous section. This yields a data set of (features, label) pairs where features are the job functions of the lead, and label is success or failure. From such a data set, the database system may algorithmically (i.e. automatically) associate a success-prediction strength with each job function. Using this, the database system may identify which, if any, job functions strongly predict success. Such insights could be shared with suitable marketing or sales reps to help in their prospecting.

Although these examples describe the database system outputting an object to a user, the database system may or may not enable the user to view any identified job responsibilities associated with the object, based on privacy settings. While these examples describe the database system outputting a message that includes an object that is associated with an identified job responsibility, the message may not include such an object when the message references an account or an executive. For example, the database system may calculate the number of contacts whose contact objects are associated with the same identified job responsibility and who also work for the same company, such as the 100 contacts at Acme Corporation who are associated with the identified Business Development job responsibility, and the 50 contacts at MegaCorp who are associated with the Mobile Marketing job responsibility.

Continuing this example, the database system outputs Acme Corporation's account object, but not any individual's contact object associated with the identified Business Development job responsibility, in response to a system user's search for accounts with the identified Business Development job responsibility. Further to this example, the database system outputs MegaCorp's account object as a suggested account to a marketer because the database system identified the marketer's previous success at prospecting accounts with the Mobile Marketing job responsibility, searched for accounts with the identified Mobile Marketing job responsibility, and identified the MegaCrop account object with the identified Mobile Marketing job responsibility, which may be referred to as predictive account scoring. Similarly, the database system may calculate the number of contacts whose contact objects are associated with the same identified job responsibility and who also work for the same person, such as the 100 contacts at Acme Corporation who are associated with the identified Business Development job responsibility and who work under John Smith, Acme Corporation's Vice President of Sales. For this example, the database system outputs John Smith's contact object in response to a system user's search for Vice Presidents whose employees have the identified Business Development job responsibility, even if John Smith's contact record is not associated with the identified Business Development job responsibility.

The method 100 may be repeated as desired. Although this disclosure describes the blocks 102-116 executing in a particular order, the blocks 102-116 may be executed in a different order. In other implementations, each of the blocks 102-116 may also be executed in combination with other blocks and/or some blocks may be divided into a different set of blocks.

FIGS. 2A-2B illustrate extremely simplified example graphs for associating job responsibilities with job titles, under an embodiment. FIG. 2A depicts an extremely simplified directed graph 200, in which node frequency indicates how often the corresponding job responsibility occurs in a data set, and edge frequency indicates how often the corresponding pair of job responsibilities are associated with each other in the data set. For example, the "(1000) Digital Marketing" node indicates that the digital marketing job responsibility occurs 1,000 times in a data set, and the "0.05" directed arc from the "(1000) Digital Marketing" node to the "(100) Interactive Marketing" node indicates that 5% of the time that a job title is associated with the digital marketing job responsibility, the job title is also associated with the interactive marketing job responsibility. In an applied example, after identifying the interactive marketing job responsibility for a job title, the database system accesses the directed graph 200, identifies the interactive marketing job responsibility node, determines that 50% of the time the interactive marketing job responsibility is associated with the digital marketing job responsibility, 30% of the time the interactive marketing job responsibility is associated with the online marketing job responsibility, and 25% of the time the interactive marketing job responsibility is associated with the mobile marketing job responsibility. Based on this determination and a 35% threshold, the database system identifies the digital marketing job responsibility as a related job responsibility for the identified interactive marketing job responsibility, and associates the digital marketing job responsibility with the corresponding object.

FIG. 2B depicts an extremely simplified undirected graph 202, in which node frequency indicates how often the corresponding job responsibility occurs in a data set, and edge frequency indicates how often the corresponding pair of job responsibilities are associated with each other in the data set. For example, the "(1000) Digital Marketing" node indicates that the digital marketing job responsibility occurs 1,000 times in a data set, and the "50" arc connecting the "(1000) Digital Marketing" node to the "(100) Interactive Marketing" node indicates the 50 times that a job title is associated with both the digital marketing job responsibility and the interactive marketing job responsibility. FIGS. 2A-2B depict extremely simplified graphs 200 and 202 because such graphs in a production environment may include thousands of nodes and millions of arcs, which would be far too complex for depiction in these figures.

System Overview

Figure 3:
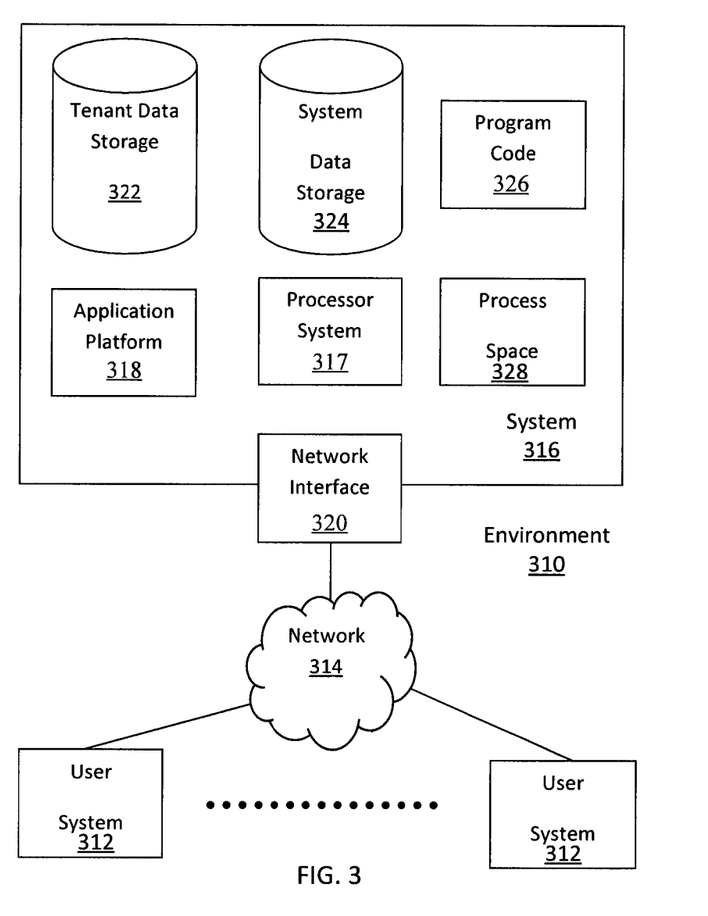
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
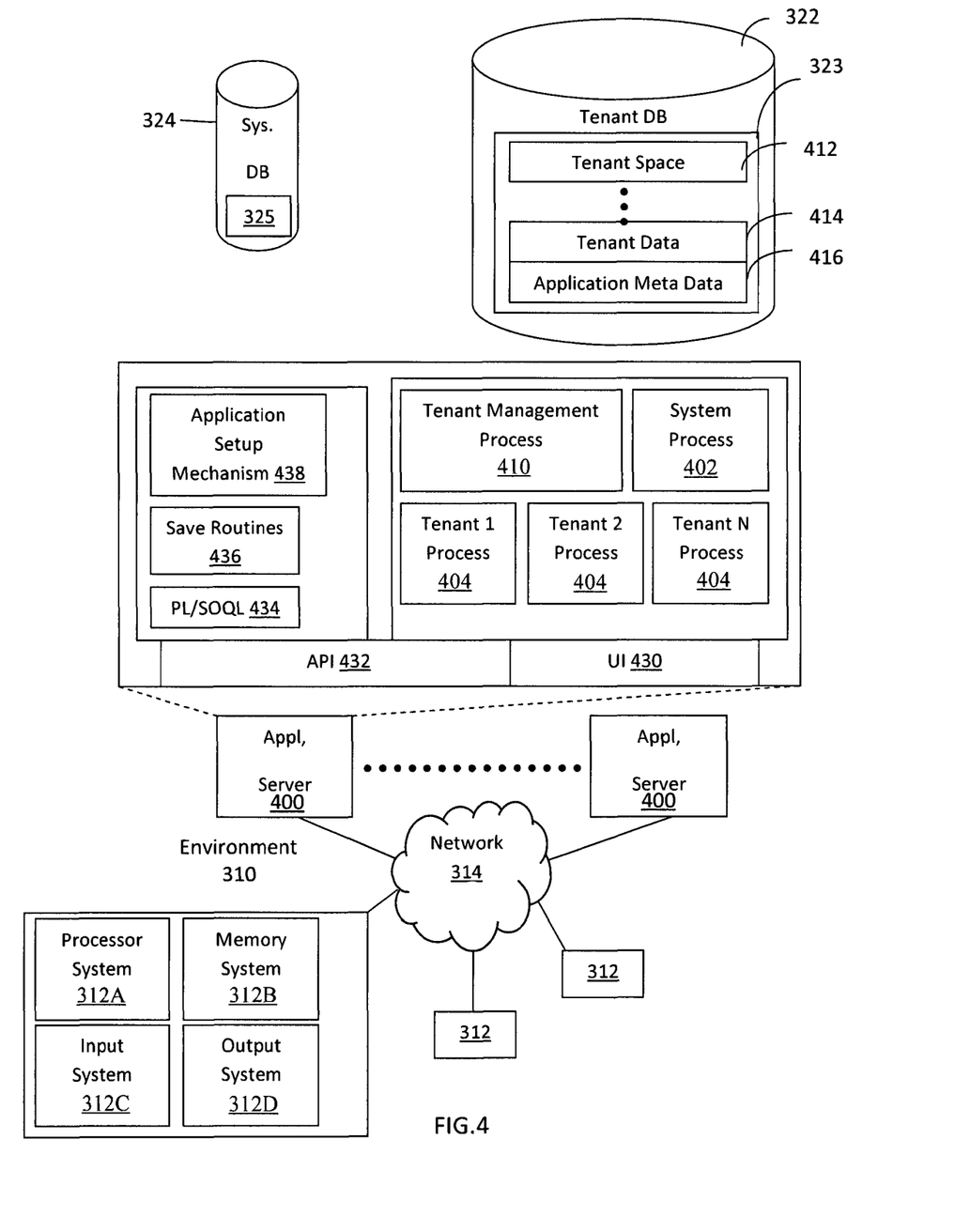
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412.

The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 400₁ might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for associating job responsibilities with job titles, the system comprising:
   one or more processors; and
   a non-transitory computer readable medium storing a plurality of instructions, which when executed, cause the one or more processors to:
      predict, by a database system, a job level and a job department based on a job title stored by an object;
      estimate, by a trained machine-learning system, a plurality of probabilities that jobs at the job level have a corresponding plurality of level-based job responsibilities based on using a directed acyclic graph, which comprises nodes that represent job responsibilities and edges between the nodes that represent associations between the job responsibilities;
      estimate, by the trained machine-learning system, a plurality of probabilities that jobs in the job department have a corresponding plurality of department-based job responsibilities based on using the directed acyclic graph;
      identify, by the database system, at least one job responsibility associated with the job title based on the estimated plurality of probabilities corresponding to the plurality of level-based job responsibilities and the estimated plurality of probabilities corresponding to the plurality of department-based job responsibilities;
      store, by the database system, each identified job responsibility in at least one of metadata associated with the object and a field associated with the object; and
      output, by the database system to a user device, a message based on the object in response to a search that specifies any identified job responsibility.

2. The system of claim 1, wherein identifying the at least one job responsibility associated with the job title based on the estimated plurality of probabilities corresponding to the plurality of level-based job and the estimated plurality of probabilities corresponding to the plurality of department-based job responsibilities is further based on an estimated plurality of probabilities that jobs in the jobs department and at the jobs level have a corresponding plurality of general job responsibilities.

3. The system of claim 1, comprising further instructions, which when executed, cause the one or more processors to identify, by the database system, a second job responsibility by identifying a plurality of tokens in the job title and identifying the plurality of tokens in a listed job responsibility of a plurality of listed job responsibilities.

4. The system of claim 3, wherein identifying the second job responsibility comprises identifying a first position in the job title for a first token of the plurality of tokens, identifying a second position in the job title for a second token of the plurality of tokens, and determining whether the first position in the job title relative to the second position in the job title is within a specified number of positions.

5. The system of claim 3, comprising further instructions, which when executed, cause the one or more processors to identify, by a database system, a third job responsibility related to at least one of the at least one job responsibility and the second job responsibility.

6. The system of claim 5, wherein identifying the third job responsibility comprises identifying a graph node associated with one of the at least one job responsibility and the second job responsibility, and identifying a weighted arc from the graph node to a related graph node associated with the third job responsibility.

7. A computer program product comprising computer-readable program code to be executed by one or more processors when retrieved from a non-transitory computer-readable medium, the program code including instructions to:
   predict, by a database system, a job level and a job department based on a job title stored by an object;
   estimate, by a trained machine-learning system, a plurality of probabilities that jobs at the job level have a corresponding plurality of level-based job responsibilities based on using a directed acyclic graph, which comprises nodes that represent job responsibilities and edges between the nodes that represent associations between the job responsibilities;
   estimate, by the trained machine-learning system, a plurality of probabilities that jobs in the job department have a corresponding plurality of department-based job responsibilities based on using the directed acyclic graph;
   identify, by the database system, at least one job responsibility associated with the job title based on the estimated plurality of probabilities corresponding to the plurality of level-based job responsibilities and the estimated plurality of probabilities corresponding to the plurality of department-based job responsibilities;
   store, by the database system, each identified job responsibility in at least one of metadata associated with the object and a field associated with the object; and
   output, by the database system to a user device, a message based on the object in response to a search that specifies any identified job responsibility.

8. The computer program product of claim 7, wherein identifying the at least one job responsibility associated with the job title based on the estimated plurality of probabilities corresponding to the plurality of level-based job and the estimated plurality of probabilities corresponding to the plurality of department-based job responsibilities is further based on an estimated plurality of probabilities that jobs in the jobs department and at the jobs level have a corresponding plurality of general job responsibilities.

9. The computer program product of claim 7, wherein the program code comprises further instructions to identify, by the database system, a second job responsibility by identifying a plurality of tokens in the job title and identifying the plurality of tokens in a listed job responsibility of a plurality of listed job responsibilities.

10. The computer program product of claim 9, wherein identifying the second job responsibility comprises identifying a first position in the job title for a first token of the plurality of tokens, identifying a second position in the job title for a second token of the plurality of tokens, and determining whether the first position in the job title relative to the second position in the job title is within a specified number of positions.

11. The computer program product of claim 9, wherein the program code comprises further instructions to identify, by a database system, a third job responsibility related to at least one of the at least one job responsibility and the second job responsibility.

12. The computer program product of claim 11, wherein identifying the third job responsibility comprises identifying a graph node associated with one of the at least one job responsibility and the second job responsibility, and identifying a weighted arc from the graph node to a related graph node associated with the third job responsibility.

13. A method for associating job responsibilities with job titles, the method comprising:
predicting, by a database system, a job level and a job department based on a job title stored by an object;
estimating, by a trained machine-learning system, a plurality of probabilities that jobs at the job level have a corresponding plurality of level-based job responsibilities based on using a directed acyclic graph, which comprises nodes that represent job responsibilities and edges between the nodes that represent associations between the job responsibilities;
estimating, by the trained machine-learning system, a plurality of probabilities that jobs in the job department have a corresponding plurality of department-based job responsibilities based on using the directed acyclic graph;
identifying, by the database system, at least one job responsibility associated with the job title based on the estimated plurality of probabilities corresponding to the plurality of level-based job responsibilities and the estimated plurality of probabilities corresponding to the plurality of department-based job responsibilities;
storing, by the database system, each identified job responsibility in at least one of metadata associated with the object and a field associated with the object; and
outputting, by the database system to a user device, a message based on the object in response to a search that specifies any identified job responsibility.

14. The method of claim 13, wherein identifying the at least one job responsibility associated with the job title based on the estimated plurality of probabilities corresponding to the plurality of level-based job and the estimated plurality of probabilities corresponding to the plurality of department-based job responsibilities is further based on an estimated plurality of probabilities that jobs in the jobs department and at the jobs level have a corresponding plurality of general job responsibilities.

15. The method of claim 13, wherein the method further comprises identifying, by the database system, a second job responsibility by identifying a plurality of tokens in the job title and identifying the plurality of tokens in a listed job responsibility of a plurality of listed job responsibilities.

16. The method of claim 15, wherein identifying the second job responsibility comprises identifying a first position in the job title for a first token of the plurality of tokens, identifying a second position in the job title for a second token of the plurality of tokens, and determining whether the first position in the job title relative to the second position in the job title is within a specified number of positions.

17. The method of claim 15, wherein the method further comprises identifying, by a database system, a third job responsibility related to at least one of the at least one job responsibility and the second job responsibility.

18. The method of claim 17, wherein identifying the third job responsibility comprises identifying a graph node associated with one of the at least one job responsibility and the second job responsibility, and identifying a weighted arc from the graph node to a related graph node associated with the third job responsibility.

* * * * *